UNITED STATES PATENT OFFICE.

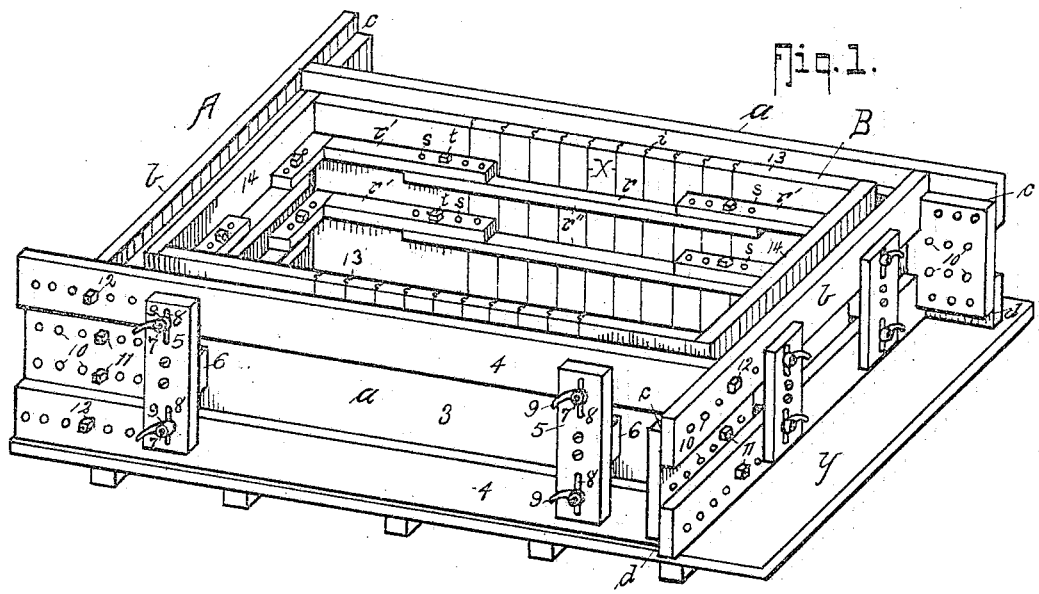

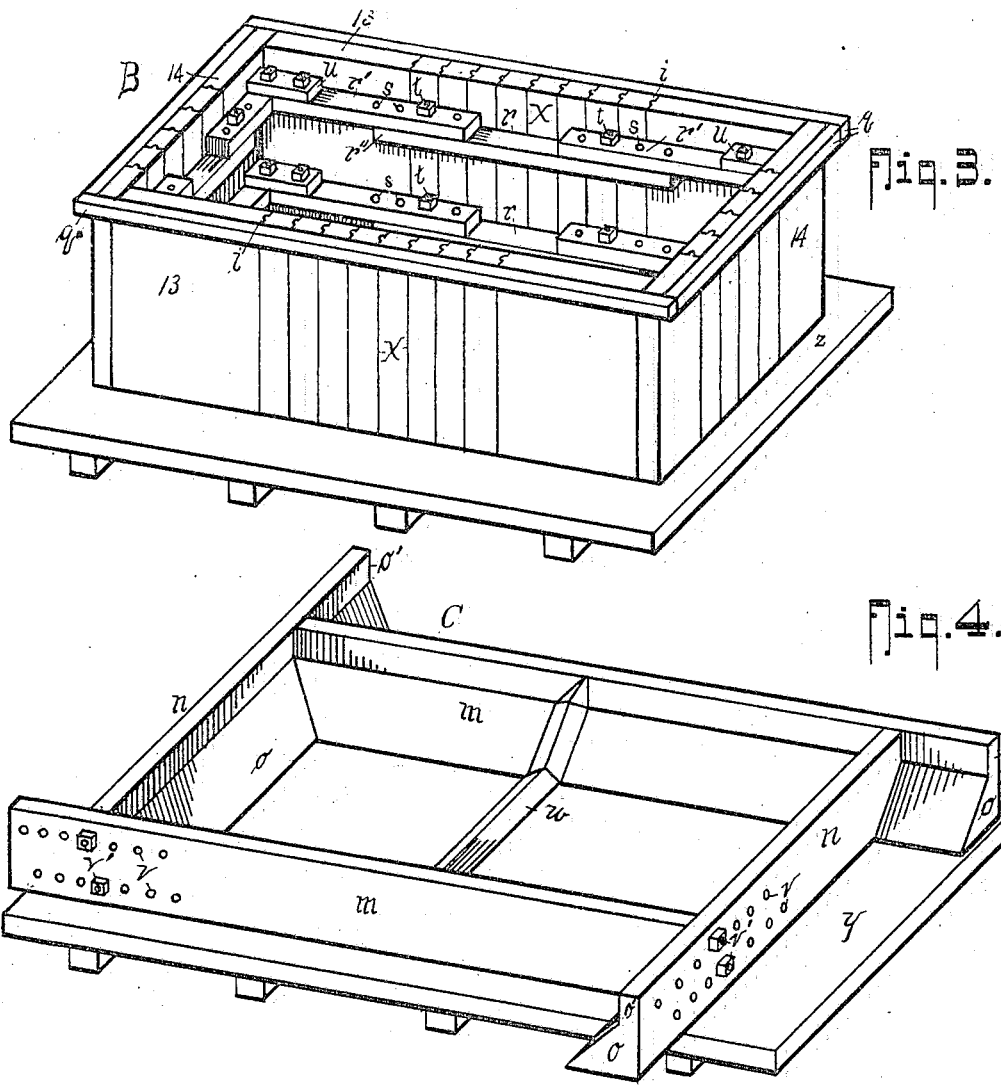

JOHN M. PRUETT AND JACOB C. SIMPSON, OF ROCKVILLE, INDIANA.

BURIAL-VAULT MOLD.

No. 809,629.     Specification of Letters Patent.     Patented Jan. 9, 1906.

Application filed June 21, 1905. Serial No. 266,221.

*To all whom it may concern:*

Be it known that we, JOHN M. PRUETT and JACOB C. SIMPSON, citizens of the United States, residing at Rockville, in the county of Parke and State of Indiana, have invented a new and useful Adjustable Burial-Vault Mold, of which the following is a specification.

Our invention relates to that class of burial-vault molds whereby burial-vaults of cement, concrete, or other similar material may be molded; and the objects of our invention are, first, to provide a burial-vault mold which may be adjusted to form or mold burial-vaults of various sizes and dimensions; second, to provide such a mold which will be economical of construction, light in weight, and convenient to assemble and knock down, and, third, to provide such a mold which may by reason of its peculiar design and construction be easily and quickly withdrawn from the molded burial-vault without waiting for the same to harden and without danger of injuring the green vault. These objects we attain by means of the mechanism illustrated in the accompanying drawings, in which—

Figure 1 is a perspective view of the mold assembled. Fig. 2 is a detail of the outer form of the mold. Fig. 3 is a detail of the inner form of the mold. Fig. 4 is a detail of the cover-mold.

Similar characters of reference refer to similar parts throughout the several views.

The outer frame A consists of two independent adjustable side walls $a$ and two end walls $b$, which are assembled and bolted together in the form of a parallelogram, as shown in Fig. 1. The side walls $a$ consist of a main or central panel 3, two adjustable molding-strips 4, and two cleats 5. The cleats 5 are mounted firmly upon blocks 6, which are bolted or otherwise attached to the main panel 3, near the ends thereof. The blocks 6 are equal in thickness to the molding-strips 4, thereby leaving an opening between the two ends of the cleats 5 and the main panel 3, adapted to receive snugly the molding-strips 4. The molding-strips are provided immediately under the respective ends of the cleats 5 with fixed bolts 7, which project outwardly and pass through perpendicular slots 8 cut in the cleats therefor, and the molding-strips are fastened at any desired position upon the cleats 5 by means of the nuts 9, provided with handle-levers. The two end walls $b$ are constructed exactly similar to the side walls $a$, except that they are relatively shorter. Near one end of each of the side and end walls, hereinafter referred to as the "free" ends, a horizontal series of bolt-holes 10 perforate both the main panels and the molding-strips. Said bolt-holes are adapted to receive fixed bolts 11, which project in suitable numbers from the abutting ends of the side and end walls $a$ $b$, which are assembled and fastened together by means of nuts 12, which are threaded upon the projecting ends of the bolts 11. It is apparent that the length and breadth of the frame A may be adjusted to any desired dimensions by engaging the bolts 11 in the bolt-holes 10, suitable for the desired dimensions. A shoulder $c$ and $d$ is formed above and below the main panels of $a$ and $b$ by the overlapping of the molding-strips thereof, adapted to receive cement during the molding of a vault, and thereby to form heavy projecting, reinforcing, and ornamental shoulders upon the finished vault.

The inner frame B of the mold consists of two adjustable side walls 13 and two similar end walls 14, assembled together in the form of a parallelogram and adapted to stand within and parallel to the corresponding walls of the outer frame A, with an open space between the two frames for the purpose of receiving cement, concrete, or other similar material of which the burial-vault is to be molded. The side walls 13 of the frame B consist of a series of perpendicular panels $x$, the edges of which fit together with tongue and grooves $i$, and two rails $r$, which consist of two end pieces $r'$ and an intermediate piece $r''$, which overlaps either end of the two end pieces $r'$ and serves as extension-rails. The three sections of the rails $r$ are provided with a series of corresponding bolt-holes $s$ for the reception of bolts $t$, whereby the three sections of rail are fastened together. The perforations or bolt-holes $s$ are spaced properly to permit of the addition or removal of one or more of the panels $x$ in order that the walls 13 and 14 may be adjusted to dimensions adapted to correspond to the changes in the outer frame A. The end walls 14 of the frame B are constructed exactly similar to the side walls 13, except that they are relatively shorter. The corresponding ends of the walls 13 and 14 are fastened together by means of blocks

*u*, which overlap the abutting ends of the corresponding rails of the walls, to which said blocks are bolted.

The cover-form C, wherein the cover or lid of a burial-vault is molded, consists of two side walls *m* and two end walls *n*, assembled and bolted together, as shown in Fig. 4. The side walls *m* consist of a broad base *o*, which tapers from the outer edge upward and backward, and a thin perpendicular portion *o'*. The object of the beveled or tapered portion *o* is to give a beveled form to the edges of the finished vault. The end walls *n* are similar to the side walls *m*, except that they are relatively shorter. The side and end walls *m* and *n* are assembled as shown in Fig. 4, the abutting ends of each wall being mitered to fit the angles of the wall to which it is attached. The abutting ends of the walls *m* and *n* are provided with two or more horizontal series of perforations *v*, adapted to receive bolts *v'*, which project from the abutting ends of the corresponding walls, and whereby the respective side and end walls *m* and *n* are bolted together. Any desired dimensions may be given the cover-mold by adjusting the bolts *v'* in the proper perforations *v*. For the purpose of convenience and safety in handling the vault-covers one or more V-shaped ribs *w*, with ends angled to conform with the angles of the cover-form, are placed at desired intervals within the cover-form C, as shown in Fig. 4, for the purpose of dividing the finished cover into two or more sections, the edges of which will meet exactly, and with a V-shaped groove flaring outward and adapted to receive a cement seal after the sections of the cover are placed. If it is desired to mold the vault-cover in one piece, it is only necessary to remove said V-shaped ribs *w*.

To mold a cover in form C, the assembled form is inverted upon a platform *y*, as shown in Fig. 4, and filled with the cement or other material of which the vault is molded, and the inner portion is scraped out or concaved to conform with the design of the cover and to reduce the walls of the cover to a proper and uniform thickness, and when the cover is set sufficiently the sides and end walls *m* and *n* are unbolted and separately withdrawn from the cover. To mold a vault by means of our mold, we place the outer form A upon a platform Z and tamp therein sufficient cement or other similar material to constitute a floor of proper thickness for the vault. The inner form B is then placed within the form A, the corresponding walls of the two forms being equidistant from each other, and the space between the two forms is then tamped full of the molding material. Large strips of square molding *q* are adjusted around the upper edge of the inner form B and pressed into the upper and inner edge of the green walls for the purpose of forming a recess adapted to receive the edges of the cover and sufficiently deep to assure a slight depression above the intersection of the edges of the cover and the walls of the vault for the reception of sealing-cement, with which such depression is filled when the cover is adjusted upon the vault. When the material of the vault is sufficiently set, the blocks *u* are unbolted from the rails of the inner form B and the walls 13 and 14 are removed separately, the strips of molding *q* are lifted out, the walls of the outer form A are unbolted from each other and withdrawn without disturbing the molded vault.

The advantages of our invention over similar devices used prior hereto consist, first, in the peculiar adjustable construction thereof, whereby vaults of various sizes may be molded in a single mold; second, our mold is simple in construction and can be furnished at a minimum cost; third, our mold can be "knocked down" completely and "nested" for the purpose of shipment, and our mold is so constructed that it can be withdrawn from the green vault without the danger of injury to the vault so common in other molds.

Having described our vault, its construction and use, what we claim as new and useful, and desire to secure by Letters Patent, is—

1. In an adjustable burial-vault mold, the combination of an adjustable outer form, composed of four independent walls, adapted to be assembled together in various positions, to render various-sized forms, suitable bolts adapted to hold said walls together with an adjustable inner form, consisting of four separate and independent walls, adapted to be assembled together in various positions to render various-sized forms, backs and bolts adapted to fasten the respective corners of the said form together, a cover-form consisting of four separate and independent walls adapted to be assembled together in various positions to render various sizes of cover-forms, and means of holding said walls in assemblage and one or more angular dividing-strips adapted to fit into the cover-form, all substantially as shown and described and for the purpose set forth.

2. In an adjustable and collapsible burial-vault mold, the combination of an outer form, comprising four separate walls composed of a main panel, two adjustable molding-strips movably attached thereto, and two cleats attached to the main panel and adapted to adjustably retain the molding-strips, and means of fastening said walls together, with an adjustable inner form comprising four separate adjustable walls, composed of a series of perpendicular panels adjustable three-piece extension-rails, means of attaching said extension-rails to said panels and corner-blocks adapted to unite abutting walls thereof, said outer and inner forms being adapted to be spaced relatively one to the other, and an adjustable cover-form comprising four separate walls, adapted to be assembled together in various positions, relatively, to each other, one or more angular dividing-strips adapted to fit into the cover-form, all substantially as described and for the purpose set forth.

In testimony that we claim the foregoing as our own we have affixed our signatures hereunto in the presence of two witnesses.

JOHN M. PRUETT.
JACOB C. SIMPSON.

Witnesses:
W. J. WHITE,
WM. E. FERGUSON.